United States Patent Office 3,402,873
Patented Sept. 24, 1968

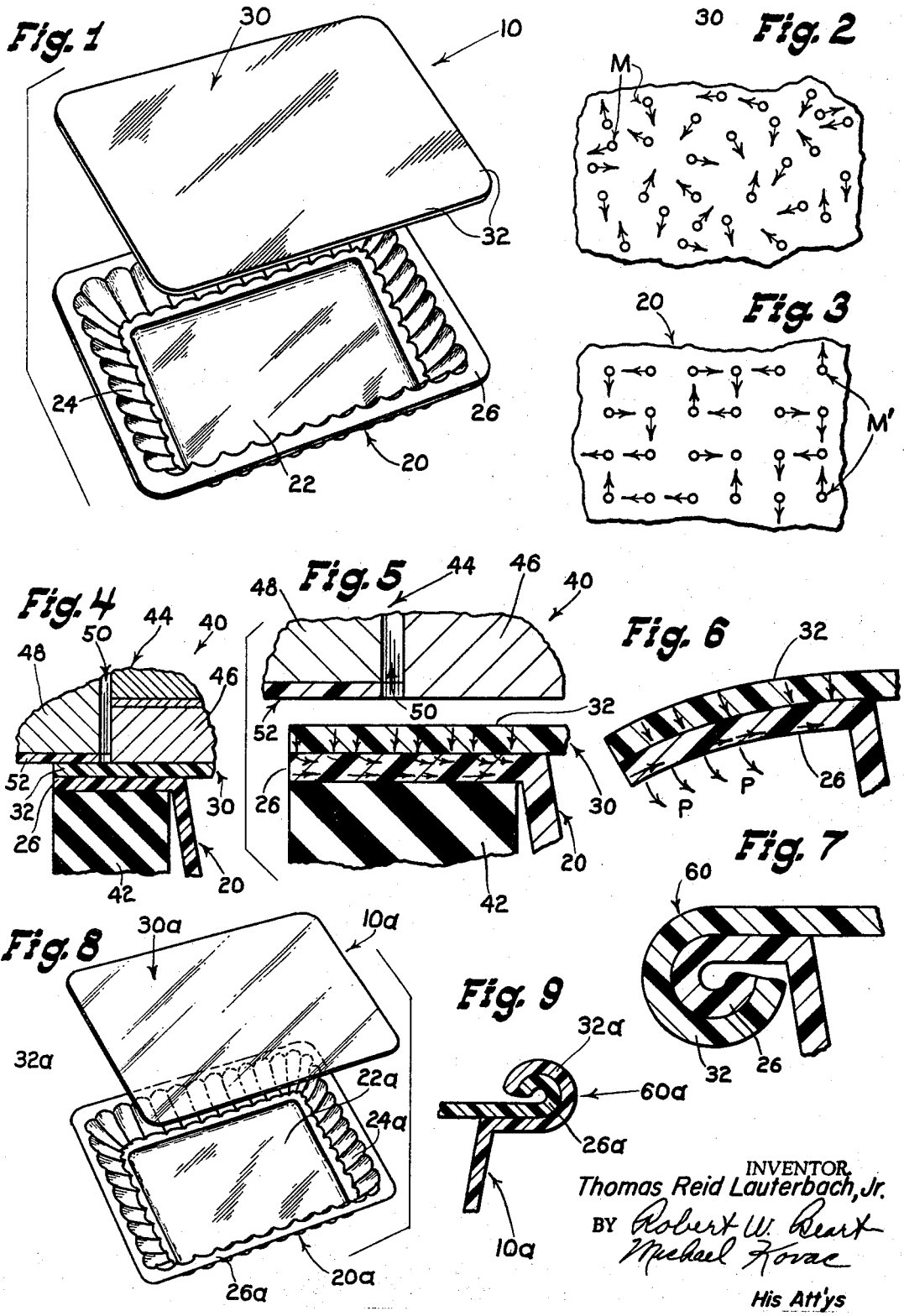

3,402,873
HEAT-SEALED ARTICLE AND METHOD
Thomas Reid Lauterbach, Jr., Elmwood Park, Ill.,
assignor to Illinois Tool Works Inc., Chicago, Ill.,
a corporation of Delaware
Filed Nov. 9, 1964, Ser. No. 409,870
12 Claims. (Cl. 229—43)

ABSTRACT OF THE DISCLOSURE

An article of manufacture composed of at least two members, portions of which are made of thermoplastic material and having a stress differential, which portions are heat sealed together in accordance with a method for heat sealing the two portions to each other.

---

Heat sealed articles or containers have primarily been made from paperboard coated or impregnated with wax, and thermoplastic materials. Commercial usage has shown that containers made from thermoplastic material are extremely advantageous over paperboard articles in that they do not become soggy in use, they do not affect the container contents, and they can be made transparent for displaying the container contents. Some thermoplastic materials have one major disadvantage, they shrink or crumble when exposed to high temperatures such as used in conventional heat sealing equipment. Recently however, suitable apparatus has been discovered, such as that disclosed and claimed in U.S. Patent No. 3,137,111 dated June 16, 1964, to J. D. Bostrom, for effectively heat sealing thermoplastic materials to each other. While the apparatus disclosed and claimed in this patent has overcome prior art deficiencies to a great degree, the heat sealed portions of the containers or other articles have not been completely satisfactory. For one thing, such portions are not exceptionally strong, and they may be rough and unsightly which is undesirable from a merchandising standpoint. There is also some problem in providing an effective seal between two heat sealed container members, the lack of which may result in spoilage or leakage of the container contents.

Accordingly, it is an object of the present invention to overcome the aforementioned and other deficiencies in the heat sealed areas of thermoplastic articles.

More particularly, it is an object of the present invention to provide a molecularly bonded and mechanically interlocked joint between a pair of articles such as containers or the like, and to the method for accomplishing the same.

Another object of the present invention is to provide a molecular bond and mechanical interlock between complementary portions of at least two articles, such as containers, wherein at least the complementary portions of said articles are made of thermoplastic material and have a stress differential.

A further object of the present invention is the provision of a package or other article composed of at least two members which exhibits a strong, rolled and continuous edge or joint therebetween.

Still another object of the present invention is the provision of a package or other article having an attractive and liquid tight joint or seal between the components thereof.

Yet still another object of the present invention is the provision of a heat sealed article and method which is less expensive than prior art endeavors, which is adapted to a multitude of products made from various thermoplastic materials, and which requires no modification of existing heat sealing equipment.

Other objects and advantages of the present invention will become apparent from the following description when read in connection with the accompanying drawings wherein:

FIG. 1 is an exploded perspective view of thermoplastic tray and lid members used in forming a heat sealed package of the present invention;

FIGS. 2–3 are views showing the molecular structure of the lid and tray members, respectively, in the package shown in FIG. 1;

FIG. 4 is an enlarged fragmentary sectional view of a suitable apparatus used to heat seal portions of the package shown in FIG. 1;

FIG. 5 is a greatly enlarged fragmentary sectional view of the heat sealing apparatus and a portion of the package just after heat and clamping pressure have been removed therefrom;

FIG. 6 is also an enlarged fragmentary sectional view of a portion of the lid and tray members after they have been molecularly bonded together by heat and clamping pressure, and showing one of the bonded portions exerting a pulling force on the other bonded portion in the package;

FIG. 7 is another enlarged fragmentary sectional view of the molecularly bonded and mechanically interlocked joint or curled edge formed in accordance with the teachings of the present invention;

FIG. 8 is an exploded perspective view of a tray and lid member package wherein the molecular structure of the package components is reversed from that shown in FIGS. 1–7; and FIG. 9 is an enlarged fragmentary sectional view of an upwardly extending joint or curled edge which can be formed on the package shown in FIG. 8.

Referring now in greater particularity to the drawings, and first to FIG. 1, there is shown a dished or container-shaped tray portion or receptacle 20 which cooperates with the lid or closure member 30 to form the package 10 of the instant invention. The tray portion 20 has a bottom wall 22 and a peripherally continuous side wall 24 extending upwardly and outwardly therefrom and terminating in a horizontally extending flange or rim portion 26 at the open upper end thereof. The side wall 24 is preferably, though not necessarily, provided with a fluted side wall and corner design such as disclosed in U.S. Patent No. 3,104,776 dated September 24, 1963, and issued in the name of J. D. Bostrom. Other rigidifying designs may be employed in the side wall as will be appreciated. The lid or closure member 30 is preferably planar in form as shown, and has marginal portions 32 which are adapted to overlie the flange or rim portions 26 of the tray 20 so that heat and pressure may be applied thereto in forming the molecularly bonded and mechanically curled or interlocked joint of the present invention.

It is to be understood that the lid and tray members of the package 10 may be of any size and shape, it only being necessary that portions thereof such as the margins or rims, overlap one another to enable such portions to be heated and clamped against each other. For example, the lid and tray members may have a round, square or irregular configuration, and various designs may be incorporated within both the lid and tray member as desired. It will also be understood that the package 10 is merely one form of article which may have a bonded and curled joint or edge. In certain instances, it may be desired to form a double walled container wherein a pair of similarly configured containers are nested one within the other and have a jointly curled rim therebetween. Other circumstances may call for a joint rim between a pair of substantially planar members such as a pair of lid or closure members 30. These examples are merely illustrative of various types of articles which may be provided with a heat sealed joint, and are not to be considered as the only possible applications of the instant invention.

In most cases, it will be desired to heat seal only a pair of members together, but it is within the purview of the present invention to heat seal two or more members by following the techniques now to be discussed.

The articles to be joined may be made of the same or dissimilar thermoplastic material, it only being important that the articles have a difference in stress or molecular orientation. In the preferred form of the invention, however, one of the articles is made of a high impact polystyrene (rubber modified) and the other of regular polystyrene. Using the embodiment disclosed as an example, the tray and lid members 20, 30 of the package 10 may have a styrene base with the lid member 30 being of the rubber modified variety.

The stress or molecular orientation of lid and tray members made of styrene or other materials is shown in FIGS. 2–3 respectively. The material of the lid member 30 does not have any particular molecular orientation, that is to say, its molecules M are not oriented in any particular direction. The tray member 20 of FIG. 3, however, has its molecules M' biaxially oriented and thus would be, as it is well know in the trade, biaxially oriented styrene. Although the molecules of the oriented article are preferably aligned along two axes, other orientations of the molecules are possible. The important aspect is that the articles to be joined have a difference in stress level or molecular orientation, and whether one of the articles has a biaxial, diagonal or other orientation is not significant.

In manufacturing the package 10, the tray and lid members 20, 30 are formed in accordance with suitable molding techniques, and are thereafter positioned one above the other with the marginal portions 32 of the lid overlying the flange or rim portions 26 of the tray. Then, suitable heat sealing equipment is used for heating and applying clamping pressure against the complementary portions of the articles. Preferably, this heat sealing equipment is of the type disclosed and claimed in U.S. Patent No. 3,137,111 aformentioned, only part of which is shown here and designated by the numeral 40 in FIGS. 4–5. This type of heat sealing equipment has a supporting member 42 upon which the flange and marginal portions 26, 32 of the tray and lid member rest. Supporting member 42 is preferably made of rubber or other suitable material so that it will yield under the pressure of the upper platen member 44 and maintain the lid and tray members in position. The upper platen member 44 is divided into a heat insulating segment 46 and a heated segment 48 which are spaced from each other by the air space 50. The lower face of the heated segment 48 is preferably coated with a material 52 which will not stick to the upper part of the lid or closure during the sealing operation. The advantages of using a heat sealing apparatus of this construction is explained in detail in U.S. Patent No. 3,137,111, it only being important to note that the combined heat insulating effect of the air space 50 with the heat insulating segment 46 and the pressure exerted by these members when the upper platen 44 presses against the marginal or rim portions of the lid and tray members prevents heat from extending to the inner marginal areas of the lid and tray members, and thus avoids its deleterious effects.

In bonding and mechanically curling the marginal or rim portions of the lid and tray members together, the upper platen 44 is lowered and exerts pressure against marginal or rim portions 26, 32 which are supported by the resilient support member 42. Heat is continuously supplied to the heated segment 48 by suitable heating elements so as to raise the temperature of the marginal or rim portions 26, 32 to their bonding or fusing temperature and create a molecular bond therebetween. Then, when the upper platen member 44 is removed from the top surface of the lid 30, differential forces are released in both marginal portions of the lid and tray members. One of these forces is the stress or pull in the biaxially oriented styrene tray member which, when heated, has a tendency to shrink and pull inwardly as indicated by the arrows in FIG. 5. The rubber modified styrene lid member, due to the fact that it is unoriented, has a tendency to relax or sag when heated as also indicated by the arrows in FIG. 5. The result of this is that when these two materials are bonded together under heat and clamping pressure and then suddenly released, the pull exerted by the stress release in the biaxially oriented styrene tray member exerts a pulling force or curling movement to the substantially stress relieved tray member as shown by the arrows P in FIG. 6. Continued movement of the tray rim portion 26 with the lid rim portion 32 bonded thereto results in a downwardly curled joint or edge 60 which is depicted in FIG. 7 of the drawings. Although not shown in the drawings, it is to be noted that the curling movement of the lid and tray member rim portions is effected while they are resting upon the supporting block 42 of the heat sealing apparatus, and thus it is not necessary to remove the package from the heat sealing equipment.

The molecularly bonded and mechanically interlocked joint 60 is extremely strong since the biaxially oriented styrene tray member is not allowed to shrink and become brittle. This joint is also attractive, and provides a peripherally continuous contact betweeen the rim portions of the members for effectively sealing the package and its contents.

A second embodiment of the invention is shown in FIGS. 8–9 and is generally similar to the FIGS. 1–7 embodiment as indicated by the application of identical reference numerals with the suffix "a" employed to designate like parts. The only essential difference here is the fact that the tray member 20a is made from unoriented material, such as rubber modified high impact styrene, and the lid member is made from an oriented material such as biaxially oriented styrene. This difference results in an upwardly curled joint 60a instead of the downwardly curled joint 60 shown in FIG. 7.

In both of the embodiments disclosed, heat is preferably applied to the rubber modified styrene article since it will readily transmit heat to the article made of biaxially oriented styrene. Thus, for the FIGS. 8–9 embodiment, the heated platen in the heat sealing equipment should be positioned below the marginal portions of both articles for first heating the rubber modified styrene article, or heated platens on both sides of the material could be used to insure that heat is applied to the marginal portions of both of the articles in sufficient amounts. These possible variations in the heat sealing equipment are indicative of the fact that apparatus other than that disclosed herein may be used in heating the marginal portions of the articles to the desired temperatures.

In the embodiments shown in the drawings as well as in other articles, it is only necessary that the complementary portions of the articles be made of thermoplastic material and have differences in stress orientation. Thus, it may be possible to make both of the members from relatively inexpensive materials except for complementary portions thereof, such as its rim or marginal areas. These complementary portions are preferably substantially continuous, although it may be desirable to interrupt them at spaced locations in certain applications.

From the foregoing, it will now be apparent that the present invention discloses a novel heat sealed article and the method for heat sealing the same. The molecularly bonded and mechanically interlocked or curled joint eliminates practically all prior art difficulties in joining complementary portions of articles, and results in a strong, attractive joint having a liquid-tight seal.

While the preferred embodiments of the present invention have been shown and described herein, it is ob-

I claim:

1. A package comprising a pair of container members having complementary configured rim portions which are superimposed relative to each other, at least the rim portions of said containers being made of thermoplastic material and having a stress differential, said superimposed rim portions being heat sealed to form a molecular bond and curled more than 90° to form a mechanical interlock.

2. The package as defined in claim 1 wherein said container members comprise a dished body and a lid means.

3. The package as defined in claim 1 wherein at least the rim portions of said containers are made of the same thermoplastic material.

4. The package as defined in claim 1 wherein at least the rim portions of said container members are made of dissimilar thermoplastic material.

5. The package as defined in claim 1 wherein the container member having the greatest stress orientation is positioned beneath said other container member whereby to create a downwardly curled joint rim between said container members.

6. The package as defined in claim 1 wherein the container member having the greatest stress orientation is positioned above said other container member whereby to create an upwardly extending joint rim between said container members.

7. A container package comprising a receptacle and a closure member having complementary superimposed rim portions, one of said members being made of a biaxially oriented thermoplastic material and said other member being made of an unoriented thermoplastic material to provide a stress differential therebetween, said superimposed rim portions being heat sealed to form a molecular bond and curled more than 90° to form a mechanical interlock.

8. A method of joining thermoplastic articles initially having differences in stress orientation, comprising the steps of subjecting at least superimposed complementary portions of said articles to heat and pressure for creating a bond therebetween, and thereafter removing said heat and pressure to cause the article having the greatest stress orientation to exert a pulling force on said other article in the vicinity of said complementary portions to create a curling movement of more than 90° between said superimposed complementary portions for also mechanically interlocking said articles and their complementary portions to each other.

9. The method of creating a liquid-tight seal between thermoplastic container and closure members having differences in stress orientation, said container having a substantially peripherally continuous flange adjacent its open mouth which is complementary in configuration to superimposed marginal portions of said closure means, comprising the steps of simultaneously heating and clamping the substantially peripherally continuous flange of said container and the marginal portions of said closure against each other for creating a bond therebetween, and thereafter removing said heat and clamping pressure to cause the marginal portion of the article having the greatest stress orientation to exert a pulling force and the marginal portion of the other article to create a curling movement of more than 90° between the substantially peripherally continuous flange of said container and the marginal portions of said closure and also provide a mechanical interlock between said container and closure.

10. The method as defined in claim 9 wherein the member having the greatest stress orientation is positioned beneath said other container member whereby to create a downwardly curled joint rim between said container members.

11. The method as defined in claim 9 wherein the member having the greatest stress orientation is positioned above said other container member whereby to create an upwardly extending joint rim between said container members.

12. The method of forming a joint rim on first and second container members having complementary configured rim portions, at least the rim portions of said first and second container members being made of thermoplastic material and having differences in stress orientation, comprising the steps of simultaneously heating and clamping the rim portions of said first and second container members against each other to create a molecular bond therebetween, and thereafter removing said heat and clamping pressure to cause the rim portion of the article having the greatest stress orientation to exert a pulling force on the rim portion of the other container member to create a curling movement between the rim portions of said container members for also mechanically interlocking said container members to each other.

References Cited

UNITED STATES PATENTS

| | | | |
|---|---|---|---|
| 2,885,105 | 5/1959 | Heyl et al. | 215—38 |
| 2,887,244 | 5/1959 | Betner | 220—67 X |
| 2,989,785 | 6/1961 | Stahl | 156—69 X |
| 3,260,775 | 7/1966 | Orr | 264—249 X |
| 2,649,392 | 8/1953 | Marshall | 53—39 |
| 2,975,931 | 3/1961 | Harrison | 220—24 |
| 3,017,729 | 1/1962 | Cheeley | 53—27 |
| 3,022,543 | 2/1962 | Baird et al. | 117—7 |
| 3,095,103 | 6/1963 | Harrison | 215—38 |
| 3,142,422 | 7/1964 | Mojonnier | 222—566 |

DAVIS T. MOORHEAD, Primary Examiner.